Patented May 12, 1953

2,638,477

UNITED STATES PATENT OFFICE 2,638,477

HYDROCARBON SYNTHESIS

Charles W. Montgomery and William A. Horne, Oakmont, Pa., assignors to Gulf Research & Development Company, Pittsburgh, Pa., a corporation of Delaware No Drawing. Application October 4, 1949, Serial No. 119,567

3 Claims. (Cl. 260—449.6)

This invention relates to hydrocarbon synthesis, and more particularly to the manufacture of hydrocarbons from carbon monoxide and hydrogen in the presence of a catalyst.

This application is a continuation-in-part of our application, Serial No. 10,942, filed February 25, 1948, now abandoned.

In the synthesis of hydrocarbons, particularly hydrocarbons boiling in the gasoline range, from hydrogen and carbon monoxide in the presence of an iron, cobalt or nickel catalyst, it has been found that the catalyst particles eventually become fractured or powdered. This is particularly true when operating a synthesis unit at high conversion and high space-time yields for the production of olefinic gasoline and minor quantities of heavier products, because for these purposes severe reaction conditions must be maintained.

Fracturing of the catalyst is particularly objectionable in an operation employing non-fluidized catalyst in a fixed bed because it leads to an increased pressure drop across the reactor and ultimately results in plugging of the reactor. In operating with a fluidized catalyst, the change in catalyst particle density and total catalyst volume by reason of catalyst fracturing ultimately lead to unsatisfactory fluidization of the catalyst. In all instances where catalyst fracturing occurs, it is necessary to cease the operation of the synthesis and replace the catalyst, thus entailing expensive and inefficient operation.

It is an object of this invention, therefore, to synthesize hydrocarbons from carbon monoxide and hydrogen in the presence of a catalyst comprising iron, cobalt or nickel without fracturing of the catalyst.

It is further an object of this invention to conduct the synthesis of gasoline from hydrogen and carbon monoxide at high efficiencies and high space-time yields while avoiding inefficient and uneconomical operations due to catalyst fracturing.

These and other objects are accomplished by the present invention, where, in the synthesis of hydrocarbons from carbon monoxide and hydrogen in the presence of a catalyst comprising a metal selected from the group consisting of iron, cobalt and nickel, the carbon formed on and within the catalyst is burned off with an oxygen-containing gas prior to the point at which catalyst fracturing begins.

We have found that the fracturing of the catalyst in the synthesis of hydrocarbons from carbon monoxide and hydrogen is due to the formation of carbon in the pores of the catalyst and in the crystal lattice of the metal of the catalyst. Although the carbon formed on and within the catalyst does not necessarily change the activity of the catalyst, it does produce an increase in catalyst volume and if not removed, leads to fracturing and powdering of the catalyst particles. This is particularly true when operating under the severe conditions required for the production of olefinic gasoline at high efficiency and high space-time yields. These conditions lead to the formation of carbon at a relatively rapid rate. For example, as much as 1 per cent of the carbon monoxide feed may be converted to carbon when charging a synthesis gas containing 2 parts of hydrogen and 1 part of carbon monoxide to a synthesis unit containing a synthetic ammonia type of iron catalyst, and operating at a temperature of 600° to 610° F., a pressure of 150 pounds per square inch gauge and a space velocity of 3000 volumes of synthesis gas per volume of catalyst per hour. With an iron catalyst, carbon formation is generally observed at temperatures above 500° F., which include the most desirable synthesis range for commercial operation. Similar carbon formation is observed with nickel and cobalt catalysts at temperatures above 450° F.

We have found that catalyst fracturing, with the attendant requirements for replacement of catalyst and shut down of the synthesis unit, can be completely avoided if the free carbon formed on the catalyst is removed therefrom prior to the point at which fracturing of the catalyst begins. Removal of the carbon is accomplished by burning off the carbon with an oxygen-containing gas. In burning off the carbon, any oxygen-containing gas, such as air, oxygen, steam and the like may be employed. Burning off of the carbon is accomplished at a temperature below that at which sintering of the catalyst, with resultant reduction in activity of the catalyst, occurs. Thus, with an iron catalyst, temperatures of about 1100° F. during the carbon burn-off should not be exceeded. The temperature at which the carbon is burned off may be controlled by mixing the oxygen-containing gas with an inert gas, such as flue gas. This may be conveniently accomplished by recirculation of the exhaust gases from the carbon burn-off to the inlet of the oxygen-containing gas in order to dilute the latter. In such recirculation, the exhaust gas may be cooled, for example by passage through a heat exchanger, prior to being mixed with the oxygen-containing gas.

Burning off of the carbon may be considered complete when no further hot zone can be observed in the catalyst bed during the burn-off cycle and/or when no further carbon dioxide is observed in the exhaust gases.

In view of the fact that in a synthesis unit employing the catalyst in a fixed bed the synthesis must be interrupted to burn carbon off the catalyst, it will ordinarily be desirable to employ several synthesis units having varying synthesis cycles in order to insure substantially continuous synthesis. In such case, the synthesis units are brought on stream at successive intervals, thus establishing synthesis cycles differing from each other by predetermined intervals, and enabling burning off of carbon in some of the units while the others are on the synthesis cycle. Although in synthesis units employing the catalyst in a fixed bed which is either fluidized or non-fluidized, it will ordinarily be desirable to conduct the carbon burn-off in the same zone in which the synthesis takes place, the catalyst may be removed from the synthesis unit and subjected to the carbon burn-off externally of the synthesis zone. When employing a fluidized catalyst in a fixed bed, that is, without moving the catalyst from the synthesis zone, a predetermined portion of the catalyst may be continuously removed from the synthesis zone, subjected to the carbon burn-off and returned to the synthesis zone. The same expedient may be adopted for a circulating fluidized catalyst.

As has been stated, carbon must be burned off the catalyst prior to the point at which catalyst fracturing begins. Once catalyst fracturing begins it is impossible to restore the catalyst to its original condition by burning off the carbon. The length of time of a synthesis cycle prior to the point at which carbon must be burned off is not fixed and will vary with the type of operation, the particular unit and the reaction conditions employed. Therefore, the maximum synthesis cycle must be determined experimentally for each synthesis unit in question. In a reactor having a non-fluidized fixed bed catalyst, the accumulation of free carbon on the catalyst produces an increase in the pressure drop across the catalyst bed, and this increase may be used as a control to indicate the necessity for burning off carbon. Thus, there is a maximum allowable pressure drop beyond which permanent catalyst fracturing develops. If the catalyst is fluidized and synthesis is conducted over the fluidized catalyst, the maximum synthesis cycle may be determined by determining the point at which fluidization of the catalyst becomes unsatisfactory. With such criteria, one skilled in the art may easily determine the maximum permissible synthesis cycle beyond which catalyst fracturing occurs.

As illustrative of our invention, a synthesis run totaling 750 hours of synthesis time was conducted at a temperature of 525° to 640° F., a pressure of 25 pounds per square inch gauge and a space velocity of 1220 volumes of synthesis gas containing 2 parts of hydrogen and 1 part of carbon monoxide. The catalyst charged was a relatively pure pelleted iron oxide which was maintained in a non-fluidized fixed bed. Under the above reaction conditions, approximately 60 per cent of the synthesis gas was converted in a single pass over the catalyst. The synthesis cycle was varied from 10 to 22 hours under the above conditions. At the conclusion of each synthesis period, the flow of synthesis gas was interrupted, the catalyst was purged with nitrogen, and air was admitted to the catalyst in the synthesis unit to burn off the carbon. The air was admitted at such a rate that the temperature of the burn-off did not exceed approximately 960° F. The burn-off cycle was concluded when no further hot zone could be observed in the catalyst bed and generally required 2 to 4 hours. Residual air was then flushed from the system and synthesis gas was admitted under reaction conditions, thereby starting another synthesis cycle. The following table shows representative synthesis cycles. As shown therein, the conversions and yields obtained during the course of the above run indicated that the activity and efficiency of the catalyst were not materially changed by the burn-off cycle, albeit a total of 32 burn-offs had taken place.

*Table I*

| Synthesis Cycle No. | Interval, Hours | Conversion, Percent | Heavy Oil Yield, Volumes | Properties of Heavy Oil | |
|---|---|---|---|---|---|
| | | | | ° API | Br₂ No. |
| 2 | 72–94 | 52.5 | 2.0 | 40.6 | 21.5 |
| 7 | 155–166 | 60.5 | 3.0 | 39.7 | 22.3 |
| 9 | 188–196 | 59.0 | 2.0 | 41.5 | 27.7 |
| 19 | 385–406 | 59.0 | 3.0 | 41.0 | 31.0 |
| 21 | 432–453 | 61.0 | 2.5 | 40.0 | 30.5 |
| 24 | 492–521 | 60.5 | 2.5 | 41.8 | 30.7 |
| 28 | 601–622 | 60.0 | 2.0 | 39.7 | 27.8 |
| 32 | 697–712 | 63.5 | 3.5 | 39.7 | 30.2 |

The maximum allowable pressure drop for the unit in which the above run was conducted was found to be approximately 0.5 pound per square inch. For example, in the above synthesis cycles pressure drops up to 0.2 pound per square inch were allowed to develop. After burning off of the carbon, a pressure drop of less than 0.05 pound per square inch remained, thus indicating that the catalyst had been restored substantially to its original condition. In one cycle, the pressure drop was allowed to reach 0.6 pound per square inch. Burning off of the carbon after this cycle only reduced the pressure drop to 0.5 pound per square inch, indicating that catalyst fracturing had begun prior to the burning off of the carbon.

In further illustration of our invention a recycle operation was conducted. In this process, the effluent from the reactor was cooled to condense the normally liquid products, which were then removed as product, and the gaseous product was blended with fresh feed and the mixture was charged to the unit. A small stream of the gaseous product was removed to prevent inerts from building up in the reactor. A run totaling 244.5 hours of synthesis time was carried out at temperatures between about 530° F. and 620° F., a pressure of about 150 pounds per square inch gauge and a space velocity of 600 volumes of fresh feed synthesis gas per hour per volume of catalyst. The ratio of recycled gas to fresh feed gas varied from about 18 to 1 to 22 to 1. The fresh feed gas had a composition varying between 2.00 and 2.15 mols of $H_2$ per mol of CO. The catalyst was a pelleted iron oxide of the precipitated type and contained traces of Mn, Na, Al, Mo, Si, Ca and Mg. It had a surface area of 2.9 square meters per gram and a density of 129.3 pounds per cubic foot. The catalyst was maintained in a non-fluidized fixed bed. The synthesis cycle varied between 23 and 105.5 hours. After the synthesis cycle the unit was vented to atmospheric pressure and purged with nitrogen by pressuring to 150 pounds per square inch and venting to atmosphere while recycling. This purge was repeated three times. The system was then pressured with nitrogen to 30 pounds and while recycling at 160 cubic feet per hour, air was admitted to burn off carbon at a rate controlled to maintain a peak temperature in the bed at 1000°–1100° F. Burning off was complete when the hot spot had progressed through the bed and the Orsat analysis indicated no further formation of carbon dioxide. The system was vented of the air and flue gas and was purged with nitrogen as above. The unit was then pressured with hydrogen and vented to the atmosphere twice to purge the unit preparatory to going back to the synthesis cycle. Table II shows the length of the cycles, the starting pressure drop across the bed, and the pressure drop prior to burning off the carbon.

Table II

| Cycle | On Stream Time, Hrs. | Pressure Drop (Start of Cycle) | Pressure Drop (End of Cycle) |
|---|---|---|---|
| 1 | 105.5 | 0.2 | 1.3 |
| 2 | 77.0 | 1.3 | 2.5 |
| 3 | 39.0 | 1.5 | 1.8 |
| 4 | 23.0 | 1.6 | 2.5 |

The synthesis conditions and conversions are shown for cycles 1 and 3 in the following table:

Table III

| Cycle No | 1 | 3 |
|---|---|---|
| Operating Conditions: | | |
| Fresh Feed, vol./hr | 30 | 30 |
| Recycle Ratio | 21.8/1.0 | 18.7/1.0 |
| Ratio: mols $H_2$/mol CO— | | |
| Fresh Feed | 2.05 | 2.12 |
| Reactor Vent | 2.76 | 2.80 |
| Space Velocity, vol./hr./vol.— | | |
| Fresh Feed | 600 | 600 |
| Reactor Feed | 13740 | 11800 |
| Pressure, p. s. i. g | 151 | 150 |
| Temperature, °F.— | | |
| Inlet | 531 | 530 |
| Gradient | 87 | 81 |
| Linear Velocity, ft./sec.[1] | 0.67 | 0.58 |
| Conversion Data: | | |
| Contraction, percent | 78.0 | 81.9 |
| CO Conversion, percent | 91.8 | 95.0 |
| $C_3$+Efficiency, percent | 69.4 | 70.7 |
| $C_5$+Efficiency, percent | 50.2 | 51.5 |

[1] Superficial.

In a recycle operation wherein the volume ratio of recycled gas to fresh synthesis gas is within the range of 5:1 to 50:1, the maximum allowable pressure drop increase across the catalyst bed prior to burning off carbon from the catalyst is given by the equation:

$$p = \frac{40A}{B}$$

wherein $p$=the increase in pressure drop in pounds per square inch over the pressure drop at the beginning of the cycle,
$A$=volumes of fresh synthesis gas per hour, and
$B$=volumes of recycle gas per hour.

As has been pointed out above, the process herein disclosed in applicable to various systems of hydrocarbon synthesis, such as those wherein the catalyst is maintained in single or multiple fixed beds, either in fluidized or non-fluidized form, and also wherein the catalyst is continuously charged to and removed from a synthesis zone followed by carbon burn-off externally of such zone. The synthesis gas may be passed through the catalyst bed only once, or it may be recycled to the catalyst bed as disclosed hereinabove. The advantages of our invention in regard to continuing catalyst efficiency and substantially uninterrupted synthesis while avoiding catalyst fracturing are applicable to all of such systems.

Our invention is applicable to any iron, cobalt or nickel catalyst useful in the synthesis of hydrocarbons from carbon monoxide and hydrogen. Such catalysts may be promoted with oxides of other metals, such as aluminum, potassium, thorium, manganese, etc., or may be unpromoted, as desired. It will be understood that in the burn-off cycle, iron cobalt and nickel catalysts are converted to their oxides. These oxides need not be reduced prior to being used in the synthesis cycle, but may be used directly in the synthesis.

The conditions for the synthesis may vary widely, but for commercial operation it is preferred to employ temperatures in the range 500° to 700° F., pressures in the range 150 to 600 pounds per square inch gauge, and synthesis gas space velocities of about 500 to 5000 volumes of fresh synthesis gas per volume of catalyst per hour. Ordinarily, the fresh synthesis gas will contain hydrogen and carbon monoxide in a mol ratio in the range 1:1 to 2.2:1.

We claim:

1. A process for the synthesis of gasoline hydrocarbons which comprises passing a synthesis gas mixture containing carbon monoxide and hydrogen over an iron catalyst maintained in a non-fluidized fixed bed under synthesis conditions including a temperature in the range 500° to 700° F., separately recovering gases and normally liquid hydrocarbons including gasoline hydrocarbons from the resulting products, recycling the recovered gases together with fresh synthesis gas in a substantially constant volume ratio of recycled gases to fresh synthesis gas within the range of 5:1 to 50:1 over the catalyst under the aforesaid synthesis conditions, interrupting the flow of synthesis gas over the catalyst prior to an increase in pressure drop across the catalyst bed in excess of that expressed by the equation:

$$p = \frac{40A}{B}$$

wherein $p$=the increase in pressure drop in pounds per square inch over the pressure drop at the beginning of the cycle, $A$=volumes of fresh synthesis gas per hour, and $B$=volumes of recycle gas per hour, burning off carbon from the catalyst with an oxygen-containing gas at a temperature below that at which sintering of the catalyst occurs, and passing a synthesis gas mixture containing carbon monoxide and hydrogen over the burned off catalyst as aforesaid.

2. A process for the synthesis of hydrocarbons which comprises passing a synthesis gas mixture containing carbon monoxide and hydrogen over a catalyst comprising a metal selected from the group consisting of iron, cobalt, and nickel maintained in a non-fluidized fixed bed under synthesis conditions, separately recovering gases and normally liquid hydrocarbons from the resulting products, recycling a portion of the recovered gases together with fresh synthesis gas over the catalyst under the aforesaid synthesis conditions such that the volume ratio of recycled gases to fresh synthesis gas is substantially constant and within the range of 5:1 to 50:1, interrupting the flow of synthesis gas over the catalyst prior to an increase in pressure drop across the catalyst bed in excess of that expressed by the equation:

$$p = \frac{40A}{B}$$

wherein $p$ equals the increase in pressure drop in pounds per square inch over the pressure drop at the beginning of the cycle, $A$ equals volumes of fresh synthesis gas per hour, and $B$ equals volumes of recycle gas per hour, burning off carbon from the catalyst with oxygen-containing gas at a temperature below that at which sintering of the catalyst occurs, and passing a synthesis gas mixture containing carbon monoxide and hydrogen over the burned-off catalyst as aforesaid.

3. A process for the synthesis of hydrocarbons which comprises passing a synthesis gas mixture containing carbon monoxide and hydrogen over an iron catalyst maintained in a non-fluidized fixed bed under synthesis conditions, separately recovering gases and normally liquid hydrocarbons from the resulting products, recycling recovered gases and fresh synthesis gas in a substantially constant volume ratio of about 18 to 22 volumes of recovered gases for each volume of fresh synthesis gas in contact with the catalyst under the aforesaid synthesis conditions, interrupting the flow of synthesis gas over the catalyst prior to an increase in pressure drop across the catalyst bed in excess of that expressed by the equation:

$$p = \frac{40A}{B}$$

wherein $p$ equals the increase in pressure drop in pounds per square inch over the pressure drop at the beginning of the cycle, $A$ equals volumes of fresh synthesis gas per hour, and $B$ equals volumes of recycle gas per hour, burning off carbon from the catalyst with oxygen-containing gas at a temperature below that at which sintering of the catalyst occurs, and passing a synthesis gas mixture containing carbon monoxide and hydrogen over the burned-off catalyst as aforesaid.

CHARLES W. MONTGOMERY.
WILLIAM A. HORNE.

References Cited in the file of this patent

UNITED STATES PATENTS

| Number | Name | Date |
|---|---|---|
| 2,224,048 | Herbert | Dec. 3, 1940 |
| 2,238,726 | Feisst et al. | Apr. 15, 1941 |
| 2,251,554 | Sabel | Aug. 5, 1941 |